(12) United States Patent
Kwak et al.

(10) Patent No.: US 9,331,324 B2
(45) Date of Patent: May 3, 2016

(54) CONNECTOR ASSEMBLY AND BATTERY PACK HAVING THE SAME

(75) Inventors: Eunok Kwak, Suwon-si (KR); Seok Koh, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1195 days.

(21) Appl. No.: 12/539,531

(22) Filed: Aug. 11, 2009

(65) Prior Publication Data

US 2010/0203363 A1    Aug. 12, 2010
US 2013/0011698 A2    Jan. 10, 2013

Related U.S. Application Data

(60) Provisional application No. 61/151,153, filed on Feb. 9, 2009.

(51) Int. Cl.

| | |
|---|---|
| *H01M 2/30* | (2006.01) |
| *H01M 2/04* | (2006.01) |
| *H01M 2/22* | (2006.01) |
| *H01M 10/42* | (2006.01) |
| *H01R 13/11* | (2006.01) |
| *H01R 13/24* | (2006.01) |
| *H01R 13/40* | (2006.01) |
| *H01M 10/04* | (2006.01) |

(52) U.S. Cl.
CPC ............ *H01M 2/30* (2013.01); *H01M 2/0473* (2013.01); *H01M 2/22* (2013.01); *H01M 10/0436* (2013.01); *H01M 10/425* (2013.01); *H01R 13/113* (2013.01); *H01R 13/24* (2013.01); *H01R 13/40* (2013.01); *H01M 10/0413* (2013.01); *H01M 2200/106* (2013.01); *H01M 2220/30* (2013.01); *H01R 13/2485* (2013.01)

(58) Field of Classification Search
CPC ........................................ H01R 13/02–13/115
See application file for complete search history.

(56) References Cited

U.S. PATENT DOCUMENTS

| 7,387,541 B1 * | 6/2008 | Lai et al. ................. 439/660 |
|---|---|---|
| 2002/0049000 A1 | 4/2002 | Tanaka et al. |
| 2004/0191616 A1 | 9/2004 | Hirota |
| 2005/0197014 A1 | 9/2005 | Kim et al. |
| 2006/0030191 A1 | 2/2006 | Tuin et al. |
| 2008/0152994 A1 | 6/2008 | Yamagami et al. |
| 2008/0292955 A1 * | 11/2008 | Byun et al. ................. 429/163 |
| 2010/0136850 A1 | 6/2010 | Inaba et al. |

FOREIGN PATENT DOCUMENTS

| CN | 1350350 A | 5/2002 |
|---|---|---|
| CN | 101197433 A | 6/2008 |

(Continued)

OTHER PUBLICATIONS

Machine translation for Karacora, WO 02/091524 A1.*

(Continued)

*Primary Examiner* — Edu E Enin-Okut
(74) *Attorney, Agent, or Firm* — Lewis Roca Rothgerber Christie LLP (57) ABSTRACT

The present invention relates to a connector assembly and a battery pack having the same. For this purpose, provided are a connector assembly with optimized size and mounting area of the connector assembly serving as a current-carrying medium of the battery pack, and improved bond strength between the connector terminal and the housing, and a battery pack having the same.

29 Claims, 10 Drawing Sheets

(56) References Cited

FOREIGN PATENT DOCUMENTS

| | | | |
|---|---|---|---|
| DE | 201 07 605 U1 | 8/2001 | |
| EP | 1 202 401 A2 | 5/2002 | |
| EP | 1 926 160 A1 | 5/2008 | |
| JP | 2002-134196 A | 5/2002 | |
| JP | 2003-323924 A | 11/2003 | |
| JP | 2006-019296 A | 1/2006 | |
| JP | 2006-066289 A | 3/2006 | |
| JP | 2007-141805 | 6/2007 | |
| JP | 2007157452 A * | 6/2007 | ............. H01M 2/10 |
| JP | 2008-140711 A | 6/2008 | |
| JP | 2008-153107 A | 7/2008 | |
| JP | 2008-176954 | 7/2008 | |
| KR | 10-2002-0031034 A | 4/2002 | |
| KR | 10-2005-0088549 | 9/2005 | |
| WO | WO 02/091524 A1 | 11/2002 | |
| WO | WO 02091524 A1 * | 11/2002 | ............. H01R 13/24 |

OTHER PUBLICATIONS

Machine translation for Tononishi, JP 2007-157452 A.*

European Search Report dated May 6, 2010 issued in corresponding European application No. EP 10 25 0206, listing the cited references in this IDS.

Korean Office action dated May 31, 2011, corresponding to application No. 10-2010-0011077; 8 pages.

SIPO Office action dated Mar. 31, 2012, for corresponding Chinese Patent application 201010003565.7, 8 pages.

English machine translation of Japanese Publication 2008-176954, dated Jul. 31, 2008, previously filed in an IDS dated Aug. 11, 2009.

English language Machine Translation of JP 2003-323924, 13 pages.

English language Machine Translation of JP 2003-066289, 13 pages.

Japanese Office action dated Jul. 3, 2012, issued in JP 2010-004342, 3 pages.

* cited by examiner

CONNECTOR ASSEMBLY AND BATTERY PACK HAVING THE SAME

CROSS-REFERENCE TO RELATED APPLICATION

This application claims priority to and the benefit of U.S. Provisional Patent Application No. 61/151,153 filed on Feb. 9, 2009, the entire content of which is incorporated herein by reference.

BACKGROUND OF THE INVENTION

1. Field of the Invention

The present invention relates to a battery pack. More specifically, the present invention relates to a connector assembly with an optimized connector size and improved bond strength between a connector terminal and a connector housing, and a battery pack having the same.

2. Description of the Related Art

In recent years, there have been actively developed and produced compact and light portable electric/electronic devices such as cellular phones, notebook computers, camcorders, etc. Therefore, the portable electric/electronic devices are equipped with built-in battery packs, such that these devices can be operated even in places where additional power sources are not furnished. The battery packs recently employ chargeable/dischargeable secondary batteries in terms of economic interests. Typical examples of the secondary batteries may include a nickel-cadmium (Ni—Cd) battery, a nickel-metal hydride (Ni-MH) battery, a lithium (Li) battery and a lithium ion (Li-ion) secondary battery. In particular, the lithium ion secondary battery has a high drive voltage which is three times higher than that of the Ni—Cd or Ni-MH battery that is widely used as a power source for portable electronic devices. Further, the lithium ion secondary battery has a high energy density per unit weight.

Generally, the secondary batteries use a lithium oxide as a positive electrode active material and a carbonaceous material as a negative electrode active material, respectively. Lithium secondary batteries are classified into two groups, i.e. liquid electrolyte batteries and polymer electrolyte batteries, depending on the kinds of electrolytes. The batteries using liquid electrolytes are referred to as lithium ion batteries, whereas the batteries using polymer electrolytes are referred to as lithium polymer batteries.

The secondary battery is formed by the electrical connection of a protection circuit board to a bare cell including an electrode assembly and an electrolyte in a case. The bare cell performs charge and discharge of electricity via chemical reactions, and the protection circuit board prevents overcharge and overdischarge of the bare cell to thereby protect the bare cell. An assembled state of the bare cell and the protection circuit board is referred to as a core-pack. The protection circuit board of the core pack is provided with a connector. The connector transmits an electric current generated from the bare cell to the outside, upon discharge of the battery, and serves as a medium for carrying an electric current to the bare cell, upon charge of the battery.

The connector is then assembled into a connector housing to form a connector assembly. The resulting connector assembly is mounted on the protection circuit board. The connector of the connector assembly is electrically connected to the protection circuit board, and the connector housing provides electrical insulation of the connector from the outside.

However, a conventional connector assembly has shortcomings associated with size optimization upon coupling of the connector with the connector housing. That is, an increase in the mounting area of the connector leads to an increase in the overall size of the connector assembly.

Further, the conventional connector assembly suffers from disadvantages associated with separation of the connector from the connector housing. Conventionally, the connector has been simply inserted into an internal space of the connector housing upon fabrication of the connector assembly. That is, the conventional connector assembly is not provided with a structure necessary for maintaining the connection between the connector and the connector housing.

BRIEF SUMMARY OF THE INVENTION

Embodiments of the present invention provide a connector assembly which is configured to optimize size of a connector assembly and also to secure a mounting area of a connector.

Further, embodiments of the present invention provide a connector assembly which is capable of maintaining the non-separable and solid connection of a connector from a connector housing.

Additionally, embodiments of the present invention provide a battery pack having the aforesaid connector assembly.

DETAILED DESCRIPTION

Now, preferred embodiments of the present invention will be described in more detail with reference to the accompanying drawings.

Figure 1:
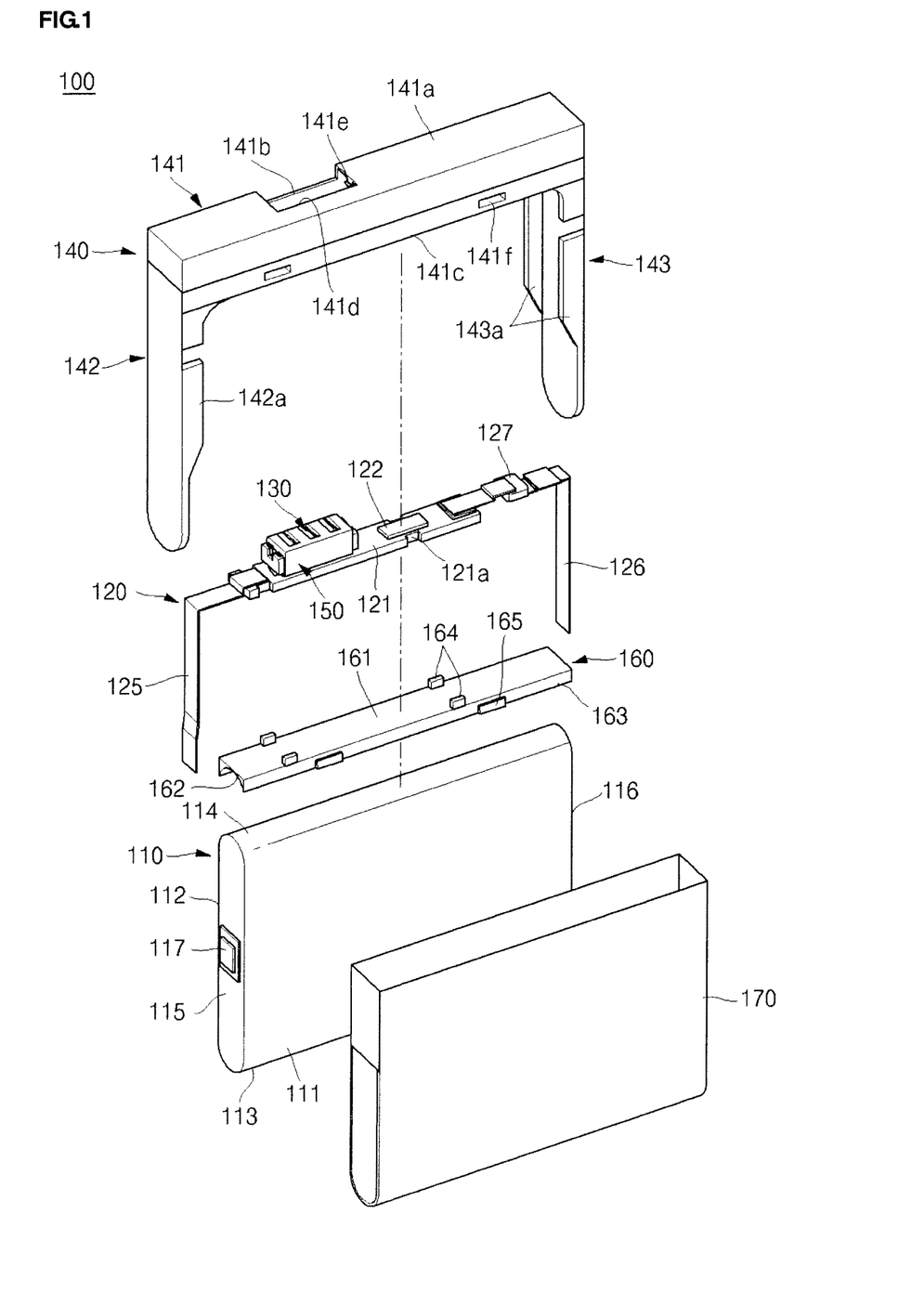
FIG. 1 is an exterior perspective view of a battery pack in accordance with one embodiment of the present invention.
Figure 2:
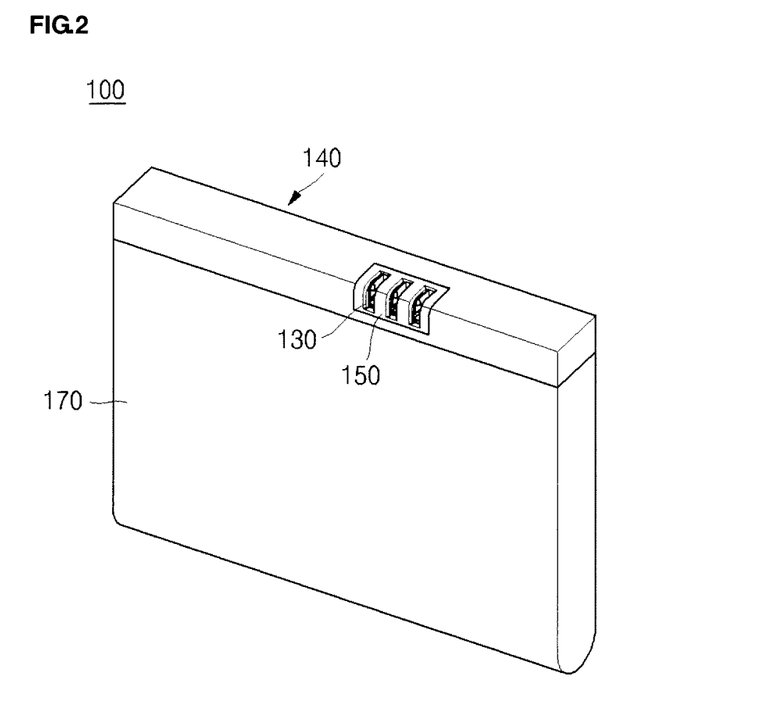
FIG. 2 is an exploded perspective view of a battery pack in accordance with one embodiment of the present invention.
Figure 3:
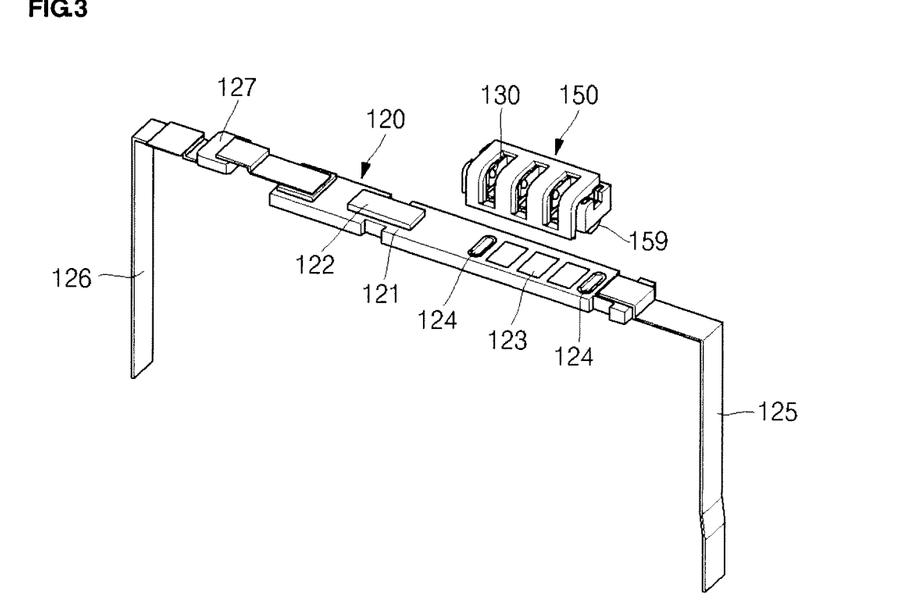
FIG. 3 is an assembly view of a connector housing and a protection circuit board in accordance with one embodiment of the present invention.
Figure 4:
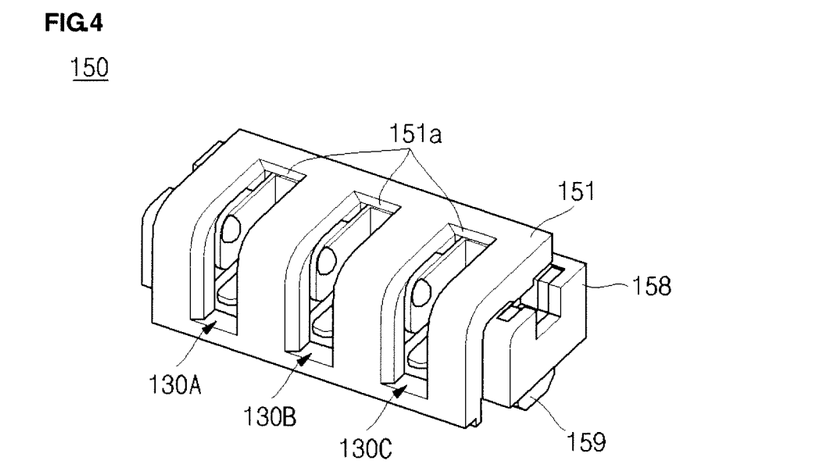
FIG. 4 is a perspective view of a connector assembly in accordance with one embodiment of the present invention.
Figure 5:
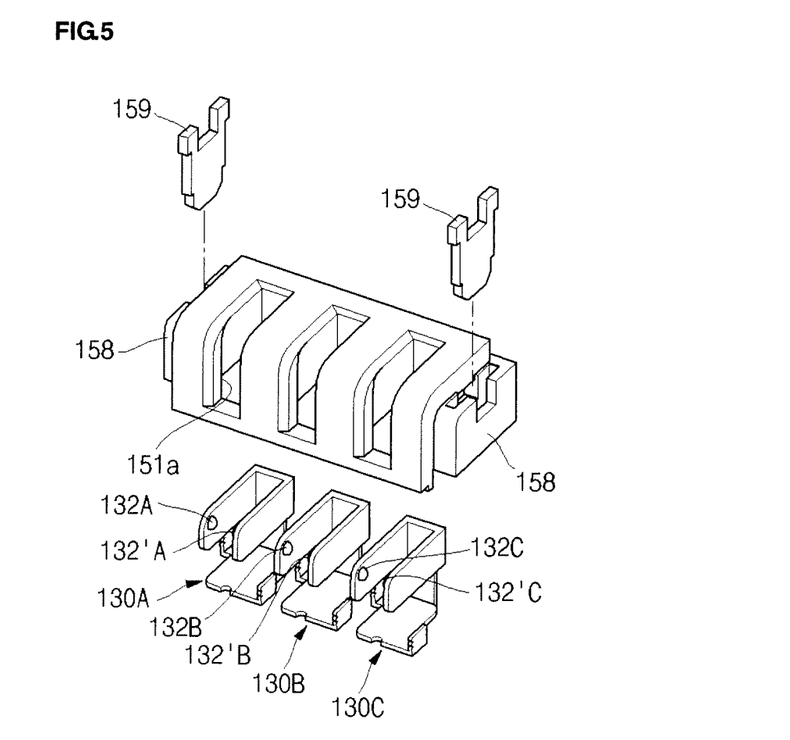
FIG. 5 is an exploded perspective view of FIG. 4.
Figure 6:
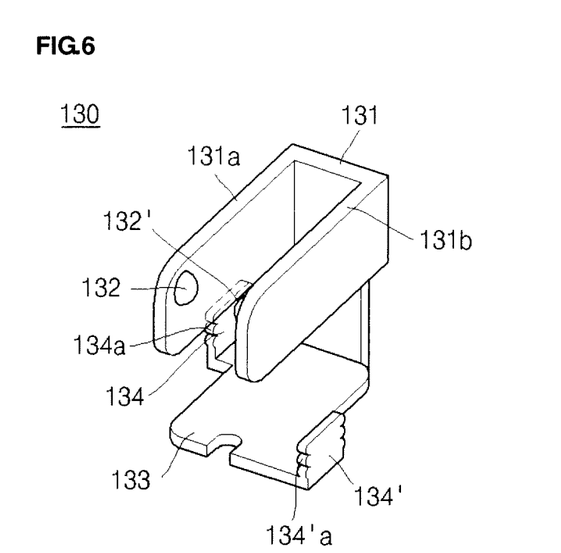
FIG. 6 is a perspective view of a connector terminal in accordance with one embodiment of the present invention.
Figure 7:
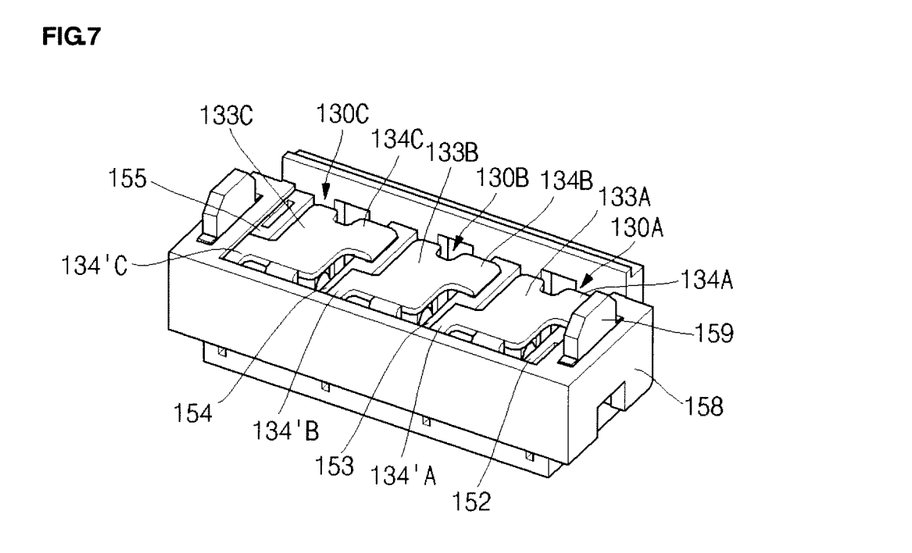
FIG. 7 is a reverse perspective view of FIG. 4.
Figure 8:
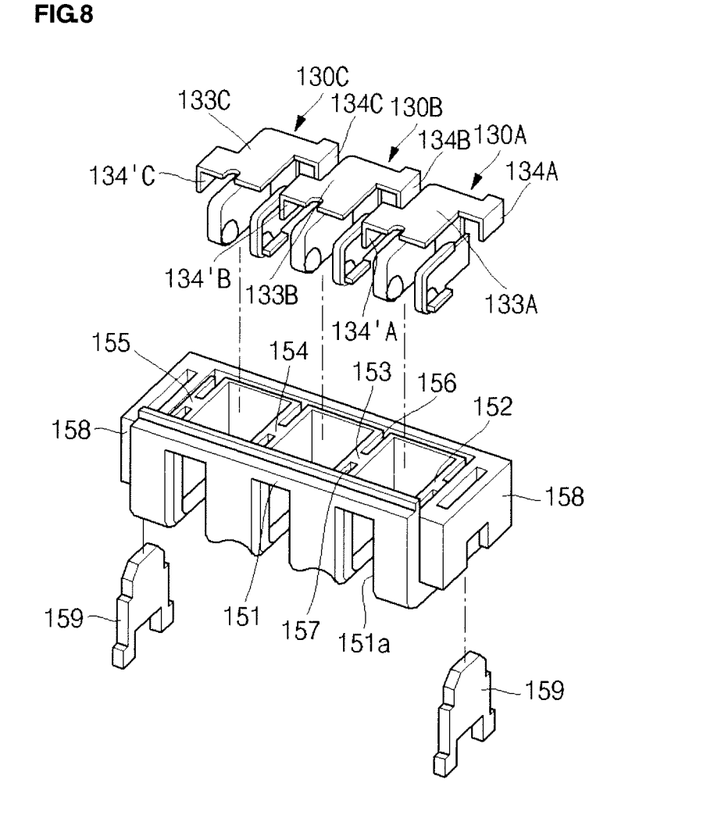
FIG. 8 is an exploded perspective view of FIG. 7.

FIG. 1 is an exterior perspective view of a battery pack in accordance with one embodiment of the present invention;

FIG. 2 is an exploded perspective view of a battery pack in accordance with one embodiment of the present invention; FIG. 3 is an assembly view of a connector housing and a protection circuit board in accordance with one embodiment of the present invention; FIG. 4 is a perspective view of a connector assembly in accordance with one embodiment of the present invention; FIG. 5 is an exploded perspective view of FIG. 4; FIG. 6 is a perspective view of a connector terminal in accordance with one embodiment of the present invention; FIG. 7 is a reverse perspective view of FIG. 4; and FIG. 8 is an exploded perspective view of FIG. 7.

Referring to FIGS. 1 to 8, a battery pack 100 in accordance with one embodiment of the present invention includes a bare cell 110 for generating an electric current, a protection circuit board 120 in electrical connection with the bare cell 110 to control charge/discharge of the bare cell 110, a cover frame 140 disposed to protect the protection circuit board 120, and a connector assembly serving as a current-carrying path between the bare cell 110 and the outside. The connector assembly includes one or more connector terminals 130 disposed on and electrically connected to the protection circuit board 120, and a connector housing 150 in which the connector terminals 130 are placed.

The battery pack 100 further includes a holder case 160 disposed in a region of the bare cell 110 where the protection circuit board 120 is placed, and a label 170 for covering an outer surface of the bare cell 110.

The bare cell 110 includes an electrode assembly which is formed by winding a positive electrode plate, a negative electrode plate and a separator disposed therebetween, and a can or like container for accommodating the electrode assembly and an electrolyte. Since the electrode assembly and the electrolyte are placed in the can or exterior member, the bare cell 110 may have a rectangular shape. Therefore, the bare cell 110 includes first and second sides 111,112 corresponding to wide-width, long-length lateral sides, third and fourth sides 113,114 formed contiguous with the first and second sides 111,112 and corresponding to narrow-width, long-length lateral sides, and fifth and sixth sides 115,116 formed on upper and lower ends of the first, second, third and fourth sides 111,112,113,114. An electrode terminal 117 is drawn from the fifth side 115 of the bare cell 110. The electrode terminal 117 may be one of a positive electrode and a negative electrode, preferably a negative electrode terminal. When the electrode terminal 117 is a negative electrode terminal, an outer surface of the bare cell 110 has a polarity of the positive electrode.

The protection circuit board 120 includes a plate-like board body 121. On one side of an upper surface of the board body 121 is disposed a protection circuit element 122 for protecting the bare cell 110 against overcharge/overdischarge of the battery. Further, the other side of an upper surface of the board body 121 is provided with several connection terminals 123 for transmitting an electric current coming from the bare cell 110 to the outside. Through-holes 124 are formed on right and left sides of the connection terminals 123. The connector housing 150 is mounted into the through-holes 124.

The protection circuit board 120 includes first and second lead plates 125,126 in electrical connection with negative and positive electrodes of the bare cell 110. Between the protection circuit board 120 and the second lead plate 126 is provided a secondary protection device 127, such as a PTC or the like.

The cover frame 140 includes a main cover 141 for covering the protection circuit board 120, and first and second auxiliary covers 142,143 being integrally formed on respective ends of the main cover 141 and covering the first and second lead plates 125,126, respectively.

The main cover 141 includes a first side 141a corresponding to an upper surface of the board body 121 of the protection circuit board 120, and second and third sides 141b,141c corresponding to both sides of the board body 121. A housing-placing groove 141d for the installation of the connector housing 150 is formed on the first side 141a and the second side 141b of the main cover 141. Both sides of the housing-placing groove 141d are provided with fixing hooks 141e. Fixing holes 141f are formed on the third side 141c. The first and second auxiliary covers 142,143 are each integrally formed on both side ends of the main cover 141. Both sides of the first and second auxiliary covers 142,143 are each provided with guide ribs 142a,143a.

The connector terminals 130, in one embodiment, include three connector terminals 130A,130B,130C. The connector terminals 130A,130B,130C are conventionally composed of a positive electrode terminal, a negative electrode terminal and a data terminal for communication of battery information. However, there is no particular limit to the number of connector terminals.

Each of the connector terminals 130A,130B,130C, in one embodiment, has the same configuration. Therefore, the structure of one connector terminal 130 will be illustrated by way of example.

The connector terminal 130 includes a connector body 131, external contacts 132,132', a board-mounting portion 133, and housing-connecting portions 134,134'.

The connector body 131 includes a first side 131a and a second side 131b which are bent to be opposite to each other. The connector body 131 is formed to have a U-shaped cross section.

The external contacts 132,132' are respectively formed inside the first side 131a and the second side 131b. The external contacts 132,132' protrude to face each other. Therefore, an external terminal is interposed between the external contacts 132,132', resulting in connection between two contacts.

The board-mounting portion 133 is formed integrally with and perpendicular to a low end of the connector body 131. The board-mounting portion 133 is formed to have an area corresponding to a mounting area of the connection terminals 123.

The housing-connecting portions 134,134' are formed at opposite side ends of the board-mounting portion 133. The housing-connecting portions 134,134' are respectively bent perpendicular to the board-mounting portion 133. On opposite side walls of the housing-connecting portions 134,134' are provided several irregularities 134a,134'a.

The connector housing 150 includes a housing body 151, several partition walls 152,153,154,155 dividing and defining an internal space of the housing body 151, and board-connecting portions 158 formed on opposite sides of the housing body 151.

The housing body 151, in one embodiment, is of a rectangular shape having an internal space where a plurality of connector terminals 130A,130B,130C are placed. Three exposure holes 151a are formed at regular intervals on the housing body 151. External contacts 132A,132'A,132B, 132'B,132C,132'C of the three connector terminals 130A, 130B,130C are each exposed to the outside through the exposure holes 151a.

The partition walls 152,153,154,155 divide the housing body 151 into three spaces. Board-mounting portions 133A, 133B,133C of the connector terminals 130A,130B,130C are extended and positioned on the partition walls 152,153,154, 155, respectively. The partition walls 152,153,154,155 are provided with at least one or more fixing holes 156,157. Into the fixing holes 156,157 are inserted the housing-connecting portions 134,134' of the connector terminals 130.

The board-connecting portions 158 are formed on both right and left sides of the housing body 131. To the board-connecting portions 158 are attached connecting members 159. The connecting members 159 are inserted into the through-holes 124 formed on both sides of the connection terminals 123 of the protection circuit board 120.

Hereinafter, an assembly process of the connector assembly in accordance with one embodiment of the present invention will be described.

A plurality of the connector terminals 130A,130B,130C are disposed in the internal space of the housing body 151. External contacts 132A,132'A,132B,132'B,132C,132'C are exposed through the exposure holes 151a of the housing body 151.

The board-mounting portions 133A,133B,133C are extended to be disposed on the partition walls 152,153,154, 155, respectively.

The housing-connecting portions 134A,134'A,134B, 134'B,134C,134'C are inserted into the fixing holes 156,157 which are each formed in the partition walls 152,153,154, 155. Herein, the housing-connecting portion 134A extends to be inserted into the partition wall 152. Further, the housing-connecting portion 134'A together with the neighboring housing-connecting portion 134B extends to be inserted into the same partition wall 153. The housing-connecting portion 134'B together with the neighboring housing-connecting portion 134C extends to be inserted into the same partition wall 154. The housing-connecting portion 134'C extends to be inserted into the partition wall 155. As such, the neighboring housing-connecting portions 134'A and 134B share the partition wall 153, and the housing-connecting portions 134'B and 134C share the partition wall 154. As a consequence, an occupying space of the connector terminals 130A,130B, 130C in the connector housing 150 is decreased. Accordingly, a size of the connector housing 150 can be reduced, thus making it possible to optimize a size of the connector assembly.

The housing-connecting portions 134A,134'A,134B, 134'B,134C,134'C inserted into the fixing holes 156,157 of the partition walls 152,153,154,155 are retained in the fixing holes 156,157 by means of the irregularities 134a,134'a formed on side walls of the individual housing-connecting portions. Accordingly, the connector terminals 130A,130B, 130C are fixed without separation to the connector housing 150.

The holder case 160 allows for horizontal support of the protection circuit board 120 on one side of the bare cell 110. The holder case 160 is of a plate shape. An upper surface 161 of the holder case 160 is formed to have a flat surface, whereas a lower surface 162 thereof is formed to have a curved surface. Right and left sides of the upper surface 161 of the holder case 160 are provided with fixing protrusions 164 which are fitted into the fixing grooves 121a of the protection circuit board 120. Further, sides 163 of the holder case 160 are provided with fixing protrusions 165 which are engaged into the fixing holes 141f of the cover frame 140.

The label 170 covers an outer surface of the bare cell 110. The label 170 is attached to cover all the remaining sides of the bare cell 110, with the exception of the fourth side 114 where the protection circuit board 120 is disposed.

Hereinafter, an assembly process of the battery pack in accordance with one embodiment of the present invention as configured above will be described.

First, an electrode assembly, which is the winding structure of a positive electrode plate, a negative electrode plate and a separator, and an electrolyte are placed in a can or like container to thereby fabricate the bare cell 110.

The protection circuit board 120 is placed on the fourth side 114 of the bare cell 110. In other words, the protection circuit board 120 is stably disposed on the fourth side 114 of the bare cell 110 by means of the holder case 160.

After the placement of the protection circuit board 120 on one side of the bare cell 110, the first lead plate 125 of the protection circuit board 120 is electrically connected to the electrode terminal 117 of the bare cell 110. In this manner, the protection circuit board 120, in one embodiment, is connected to a negative electrode of the bare cell 110. The second lead plate 126 is electrically connected to an outer surface of the bare cell 110. Accordingly, in one embodiment, the protection circuit board 120 is electrically connected to a positive electrode of the bare cell 110.

A connector assembly is disposed on an upper surface of the protection circuit board 120.

The board-mounting portions 133A,133B,133C of the connector terminals 130A,130B,130C in the connector assembly are respectively mounted onto the connection terminals 123 of the protection circuit board 120. The mounting of the components is carried out using a reflow soldering process in which a cream solder is applied to the connection terminals 123 of the protection circuit board 120 and the board-mounting portions 133A,133B,133C of the connector terminals 130A,130B,130C are placed thereon, followed by passing the assembly through a soldering machine, whereby the cream solder is melted, thus resulting in mounting of the components. Upon mounting of the connector terminals 130A,130B,130C, the connector housing 150 is also disposed on an upper surface of the protection circuit board 120. That is, the connecting members 159 of the connector housing 150 are inserted into the through-holes 124 of the protection circuit board 120. Then, the solder is flowed via the through-holes 124 to result in fixation of the connecting members 159 on the protection circuit board 120.

Next, the cover frame 140 is assembled on an upper part of the protection circuit board 120. The main cover 141 of the cover frame 140 is disposed on the fourth side 114 of the bare cell 110. The first and second auxiliary covers 142,143 are disposed on the fifth and sixth sides 115,116 of the bare cell.

Finally, an outer surface of the bare cell 110 is covered with the label 170. By means of the label 170, the first and second lead plates 125,126 of the protection circuit board 120 are fixed to the bare cell 110 while they are insulated from the outside. In addition, the first and second auxiliary covers 142,143 of the cover frame 140 are fixed to the bare cell 110 by means of the label 170.

Hereinafter, a connector assembly in accordance with another embodiment of the present invention will be described.

Figure 9:
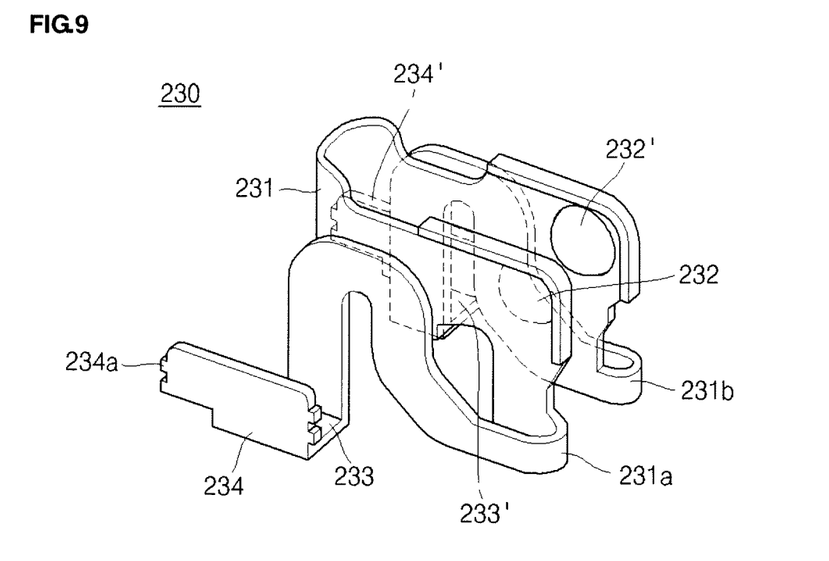
FIG. 9 is a perspective view of a connector terminal in accordance with another embodiment of the present invention.
Figure 10:
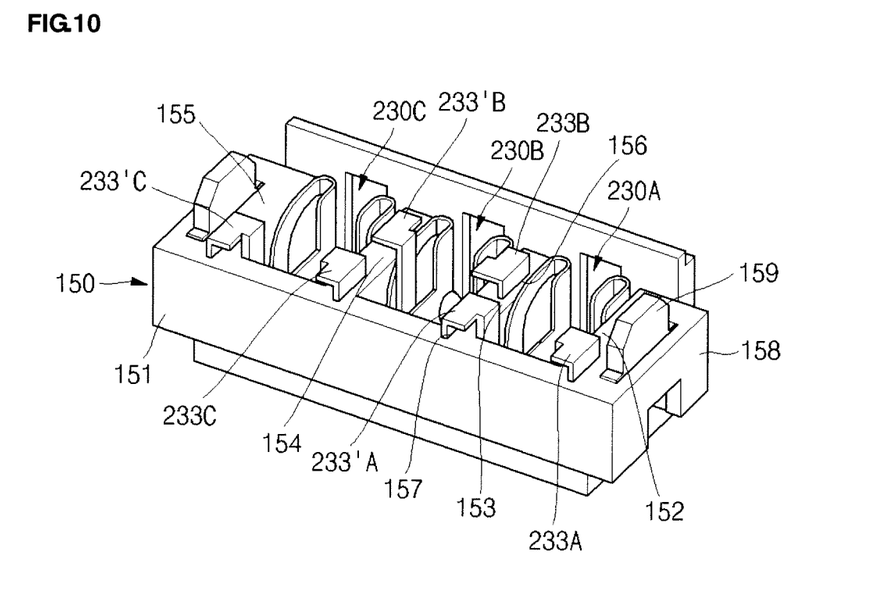
FIG. 10 is a reverse perspective view of a connector assembly in accordance with another embodiment of the present invention.
Figure 11:
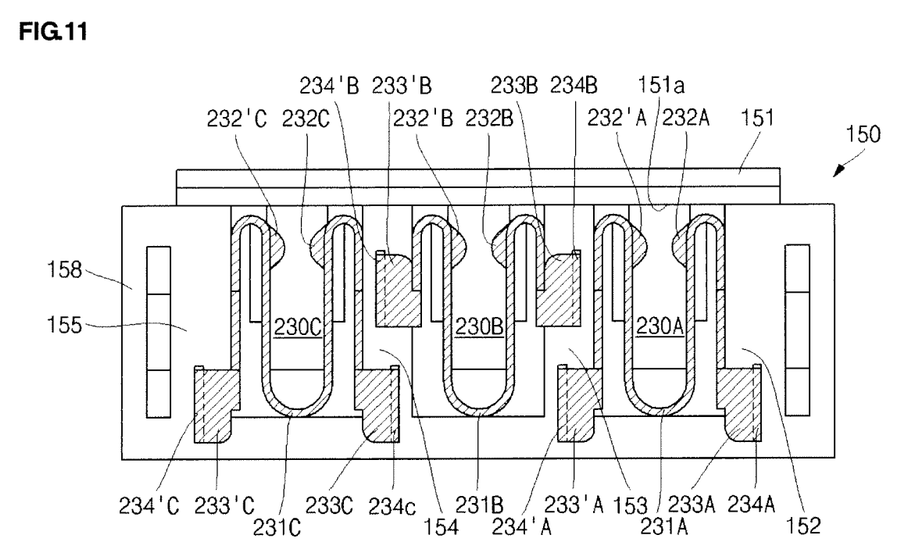
FIG. 11 is a plan view of FIG. 10.

FIG. 9 is a perspective view of a connector terminal in accordance with another embodiment of the present invention, FIG. 10 is a reverse perspective view of a connector assembly in accordance with another embodiment of the present invention, and FIG. 11 is a plan view of FIG. 10.

Referring to FIGS. 9 to 11, the connector assembly in accordance with another embodiment of the present invention includes three connector terminals 230A,230B,230C. Each of the connector terminals 230A,230B,230C may have substantially the same configuration. Therefore, the structure of one connector 230 will be illustrated by way of example. Alternatively, one or more of the connector terminals 230A, 230B,230C may have a different configuration from the other connector terminals. For example, as shown in FIGS. 10 and 11, the connector terminal 230B has a different configuration than the connector terminals 230A,230C for optimizing a size of the connector assembly.

The connector terminal 230 includes a connector body 231, external contacts 232,232', board-mounting portions 233,233', and housing-connecting portions 234,234'.

The connector body 231 includes V-shaped first and second bending portions 231a and 231b which are bent to be opposite to each other. The connector body 231 is formed to have a W-shaped cross section.

The external contacts 232,232' are respectively formed inside the first bending portion 231a and the second bending portion 231b. The external contacts 232,232' protrude to face each other. Therefore, an external terminal is interposed between the external contacts 232,232', resulting in connection between two contacts.

The board-mounting portion 233 extends from an end of the first bending portion 231a of the connector body 231. The board-mounting portion 233' extends from and is formed integrally with an end of the second bending portion 231b.

The housing-connecting portion 234 is formed perpendicular to an end of the board-mounting portion 233. The housing-connecting portion 234' is formed perpendicular to an end of the board-mounting portion 233'.

Opposite side walls of the housing-connecting portions 234,234' are provided with several irregularities 234a.

The connector housing 150 includes a housing body 151, several partition walls 152,153,154,155 dividing and defining an internal space of the housing body 151, fixing holes 156, 157 formed on the partition walls 152,153,154,155, board-connecting portions 158 formed on opposite sides of the housing body 151, and connecting members 159 being inserted into the board-connecting portions 158.

Hereinafter, an assembly process of the connector assembly in accordance with another embodiment of the present invention as configured above will be described.

A plurality of connector terminals 230A,230B,230C are disposed in the internal space of the housing body 151. External contacts 232A,232'A,232B,232'B,232C,232'C are exposed through the exposure holes 151a of the housing body 151.

The board-mounting portions 233A,233'A,233B,233'B, 233C,233'C extending from connector bodies 231A,231B, 231C are disposed on the partition walls 152,153,154,155. Here, the board-mounting portion 233A extends to the partition wall 152. Further, the board-mounting portions 233'A and 233B extend to the partition wall 153, whereas the board-mounting portions 233'B and 233C extend to the partition wall 154. The board-mounting portion 233'C extends to the partition wall 155.

In this manner, the board-mounting portions 233A,233'A, 233B,233'B,233C,233'C extend to the partition walls 152, 153,154,155, so that the housing-connecting portions 234A, 234'A,234B,234'B,234C,234'C are inserted into the fixing holes 156,157.

In the connector terminals 230A,230B,230C in accordance with another embodiment of the present invention, the board-mounting portions 233'A and 233B share the partition wall 153, and the board-mounting portions 233'B and 233C share the partition wall 154. As a consequence, an occupying space of the connector terminals in the connector housing 150 is decreased. Accordingly, a size of the connector housing 150 can be reduced, thus making it possible to achieve the size optimization of the connector assembly.

The housing-connecting portions 234A,234'A,234B, 234'B,234C,234'C inserted into the fixing holes 156,157 of the partition walls 152,153,154,155 are fixed to the fixing holes 156,157 by means of irregularities 234a formed on side walls of the individual housing-connecting portions. According to such a configuration, separation of the connector terminals 230A,230B,230C from the connector housing 150 is prevented.

Next, another embodiment of the present invention will be described in more detail with reference to the accompanying drawings.

Figure 12:
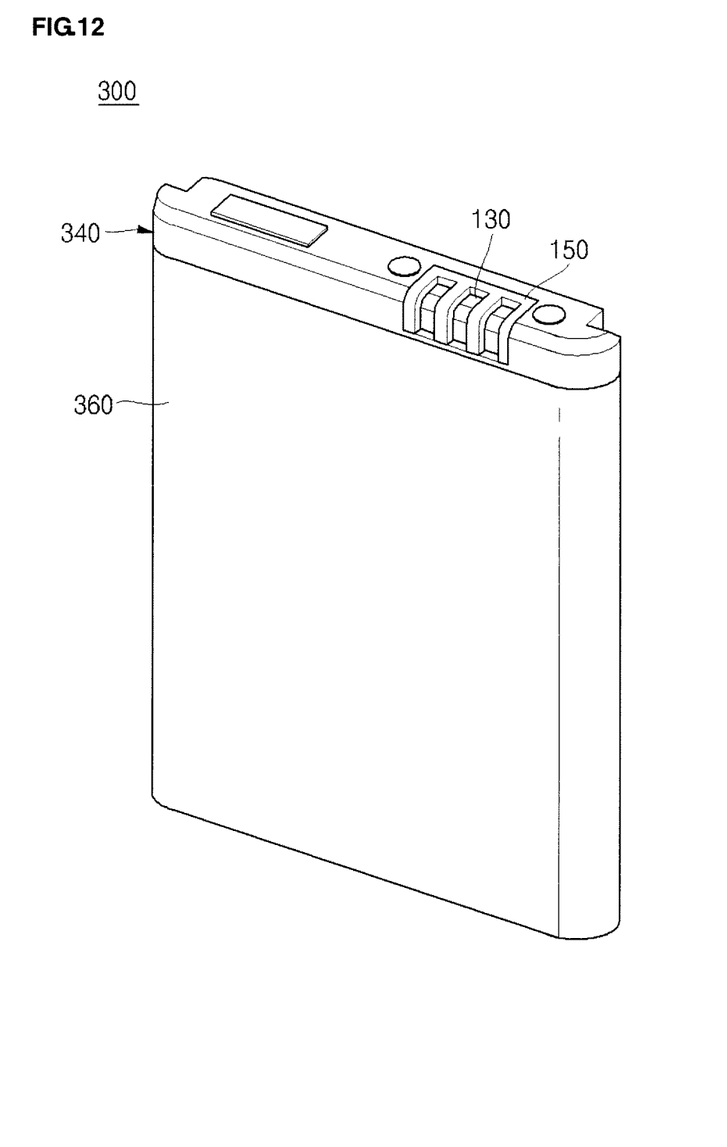
FIG. 12 is an exterior perspective view of a battery pack in accordance with another embodiment of the present invention.
Figure 13:
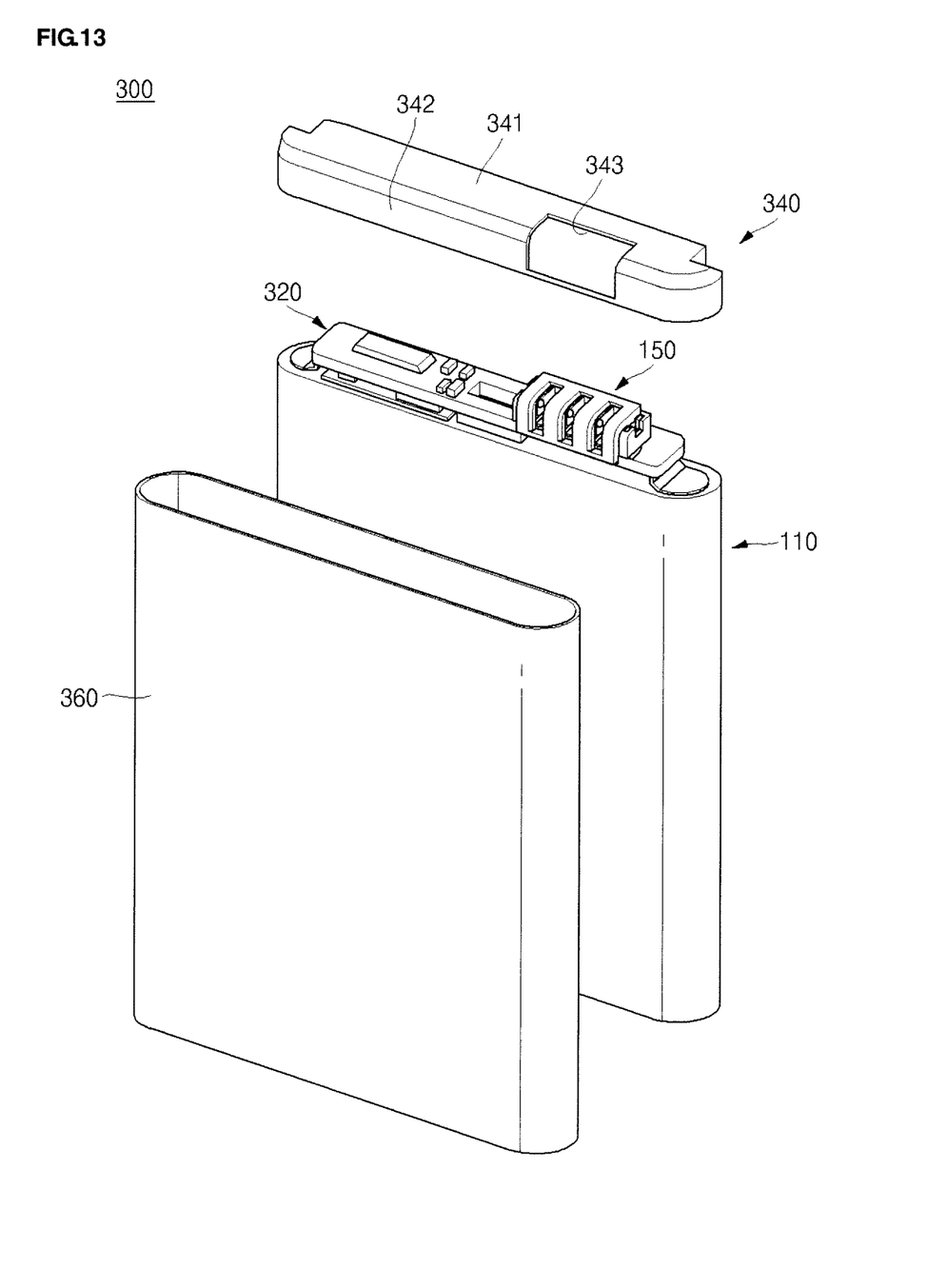
FIG. 13 is an exploded perspective view of a battery pack in accordance with another embodiment of the present invention.
Figure 14:
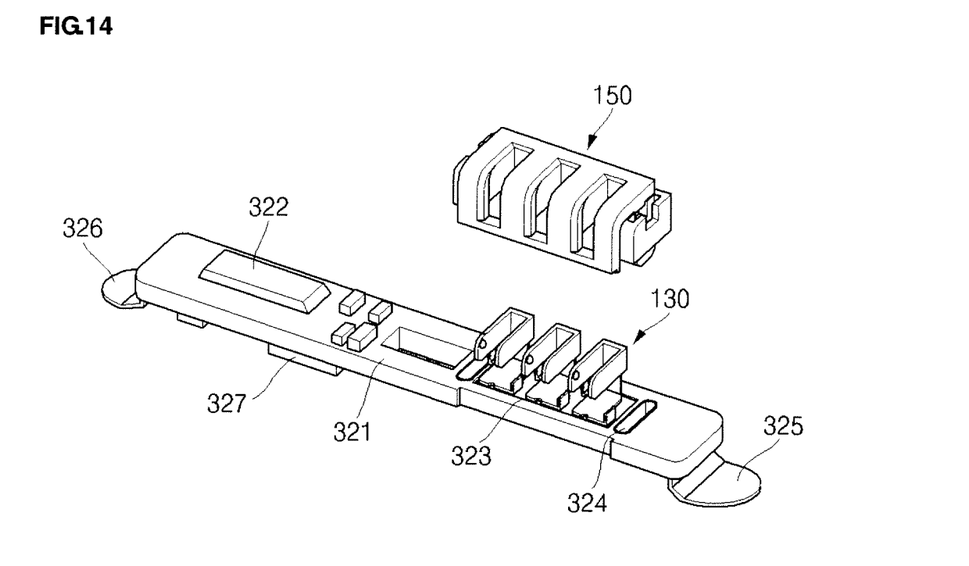
FIG. 14 is an assembly view of a connector housing and a protection circuit board in accordance with another embodiment of the present invention.
Figure 15:
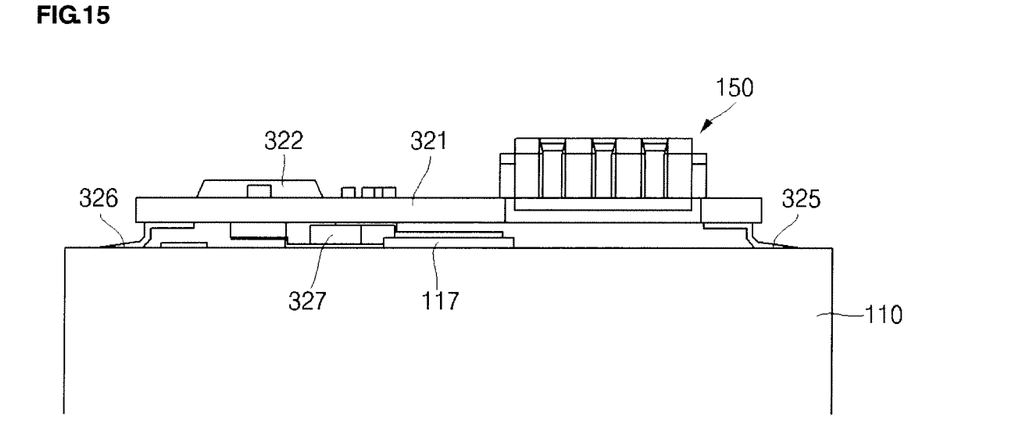
FIG. 15 is an assembly view of the a protection circuit board and bare cell in accordance with another embodiment of the present invention.

FIG. 12 is an exterior perspective view of a battery pack in accordance with another embodiment of the present invention; FIG. 13 is an exploded perspective view of a battery pack in accordance with another embodiment of the present invention; FIG. 14 is an assembly view of a connector housing and a protection circuit board in accordance with another embodiment of the present invention; FIG. 15 is an assembly view of the a protection circuit board and bare cell in accordance with another embodiment of the present invention.

Referring to FIGS. 12 to 15, a battery pack 300 in accordance with another embodiment of the present invention includes a bare cell 110 for generating an electric current, a protection circuit board 320 in electrical connection with the bare cell 110 to control charge/discharge of the bare cell 110, a cover frame 340 disposed to protect the protection circuit board 320, and a connector assembly serving as a current-carrying path between the bare cell 110 and the outside.

The connector assembly includes a connector 130 which is disposed on and electrically connected to the protection circuit board 320, and a connector housing 150 in which the connector 130 is placed. The battery pack 300 further includes a label 360 for covering an outer surface of the bare cell 110.

Further, the battery pack comprising the bare cell 110, the connector 130 and the connector housing 150 may be the same as those of the earlier-described embodiment of the present invention, that is, the battery pack 100. Like numbers refer to like elements in previously described figures, so details thereof will be omitted hereinafter.

In the battery pack 300 in accordance with another embodiment of the present invention, the protection circuit board 320 includes a plate-like board body 321. On one side of an upper surface of the board body 321 is disposed a protection circuit element 322 for protecting the bare cell 110 against overcharge/overdischarge of the battery. An upper surface of the board body 321 is provided with several connection terminals 323 for transmitting an electric current from the bare cell 110 to the outside. Through-holes 324 are formed on right and left sides of the connection terminals 323. The connector housing 150 is mounted into the through-holes 324. The protection circuit board 320 includes first and second lead plates 325, 326 in electrical connection with negative and positive electrodes of the bare cell 110. The first and second lead plates 325, 326 are welded to respective ends of an upper side of the bare cell 110. The lower surface of the protection circuit board 320 is provided with a secondary protection device 327, such as a PTC or the like.

In the battery pack 300 in accordance with another embodiment of the present invention, the cover frame 340 includes a main cover 341 for covering the protection circuit board 320, the main cover having the side 342 being integrally formed and surrounding the main cover 341. The main cover 341 includes a housing-placing groove 343 for the installation of the connector housing 150 that is formed on the side 342 of the main cover 341.

The battery pack 100 in accordance with one embodiment of the present invention is a "horizontal type battery pack,"

and the battery pack 300 in accordance with another embodiment of the present invention is a "vertical type battery pack."

As is apparent from the above description, embodiments of a battery pack in accordance with the present invention provide a connector assembly which is configured to optimize a size of a connector assembly while securing a mounting area of a connector.

Embodiments of a battery pack in accordance with the present invention provide a connector assembly which is capable of maintaining the non-separable and solid connection of a connector from a connector housing.

Further, embodiments of a battery pack in accordance with the present invention provide a battery pack having the aforesaid connector assembly.

What is claimed is:

1. A connector assembly for a battery pack, the connector assembly comprising:
   a connector housing comprising a housing body defining a cavity, and a plurality of walls spaced apart in a first direction and partitioning the cavity into a plurality of spaces between a first end of the cavity and a second end of the cavity that is spaced from the first end in the first direction; and
   a plurality of connector terminals at least partly in respective spaces of the plurality of spaces, each of the plurality of connector terminals comprising housing-connecting portions fixing the respective connector terminal to two walls of the plurality of walls,
   wherein two connector terminals of the plurality of connector terminals are fixed to one wall of the plurality of walls, one of the housing-connecting portions of a first connector terminal of the two connector terminals being inserted in the one wall at a first location of the one wall, and one of the housing-connecting portions of a second connector terminal of the two connector terminals being inserted in the one wall at a second location of the one wall, the second location being spaced apart from the first location in a second direction perpendicular to the first direction, a portion of the first connector terminal and a portion of the second connector terminal being spaced from the first end of the cavity in the first direction by a same distance.

2. The connector assembly of claim 1, wherein each of the plurality of connector terminals comprises a board-mounting portion for electrically coupling the connector terminal to a protection circuit board.

3. The connector assembly of claim 2, wherein the board-mounting portion of each of the two connector terminals of the plurality of connector terminals is on the one wall of the plurality of walls.

4. The connector assembly of claim 3, wherein the two board-mounting portions are at different locations on the one wall.

5. The connector assembly of claim 1, wherein the one wall has fixing holes, each receiving therein one of the housing-connecting portions of a respective one of the two connector terminals.

6. The connector assembly of claim 5, wherein the one housing-connecting portion of each of the two connector terminals comprises protrusions engaging a corresponding one of the fixing holes.

7. The connector assembly of claim 1,
   wherein each of the plurality of connector terminals comprises a board-mounting portion for electrically coupling the connector terminal to a protection circuit board, and
   wherein the housing-connecting portions are integrally connected to opposite sides of the board-mounting portion and extend in a same direction as one another, the direction being substantially perpendicular to a surface of the board-mounting portion for coupling the board-mounting portion to the protection circuit board.

8. The connector assembly of claim 7, wherein the housing-connecting portions comprise two housing-connecting portions that are located at diagonally opposite ends of the board-mounting portion.

9. The connector assembly of claim 7, wherein the board-mounting portion comprises at least two board-mounting portions, each comprising one of the housing-connecting portions.

10. The connector assembly of claim 2, wherein the board-mounting portion of each of the plurality of connector terminals is configured to be electrically coupled to a respective one of a plurality of connection terminals of the protection circuit board.

11. The connector assembly of claim 1, wherein the connector housing further comprises at least one board-connecting portion having an aperture receiving a connecting member of the connector assembly therethrough, the connecting member being insertable into a through-hole of a protection circuit board for attaching the connector assembly to the protection circuit board.

12. The connector assembly of claim 1, wherein each of the plurality of connector terminals comprises a pair of external contacts configured for electrically contacting an external terminal insertable between the pair of external contact.

13. A battery pack comprising:
   a bare cell;
   a protection circuit board mounted on the bare cell; and
   a connector assembly mounted on the protection circuit board, the connector assembly comprising:
      a connector housing comprising a housing body defining a cavity, and a plurality of walls spaced apart in a first direction and partitioning the cavity into a plurality of spaces between a first end of the cavity and a second end of the cavity that is spaced from the first end in the first direction; and
      a plurality of connector terminals at least partly in respective spaces of the plurality of spaces, each of the plurality of connector terminals comprising housing-connecting portions fixing the respective connector terminal to two walls of the plurality of walls,
      wherein two connector terminals of the plurality of connector terminals are fixed to one wall of the plurality of walls, one of the housing-connecting portions of a first connector terminal of the two connector terminals being inserted in the one wall at a first location of the one wall, and one of the housing-connecting portions of a second connector terminal of the two connector terminals being inserted in the one wall at a second location of the one wall, the second location being spaced apart from the first location in a second direction perpendicular to the first direction, a portion of the first connector terminal and a portion of the second connector terminal being spaced from the first end of the cavity in the first direction by a same distance.

14. The battery pack of claim 13, wherein the bare cell comprises a first terminal and a second terminal, and the protection circuit board comprises a first lead plate electrically coupled to the first terminal and a second lead plate electrically coupled to the second terminal.

15. The battery pack of claim 13, wherein each of the plurality of connector terminals of the connector assembly comprises a board-mounting portion electrically coupling the connector terminal to the protection circuit board.

16. The battery pack of claim 15, wherein the board-mounting portion of each of the two connector terminals of the plurality of connector terminals is on the one wall of the plurality of walls.

17. The battery pack of claim 16, wherein the two board-mounting portions are at different locations on the one wall.

18. The battery pack of claim 13, wherein the one wall has fixing holes, each receiving therein one of the housing-connecting portions of a respective one of the two connector terminals.

19. The battery pack of claim 18, wherein the one housing-connecting portion of each of the two connector terminals comprises protrusions engaging a corresponding one of the fixing holes.

20. The battery pack of claim 13,
wherein each of the plurality of connector terminals of the connector assembly comprises a board-mounting portion electrically coupling the connector terminal to the protection circuit board, and
wherein the housing-connecting portions are integrally connected to opposite sides of the hoard-mounting portion and extend in a same direction as one another, the direction being substantially perpendicular to a surface of the board-mounting portion coupling the board-mounting portion to the protection circuit board.

21. The battery pack of claim 20, wherein the housing-connecting portions comprise two housing-connecting portions that are located at diagonally opposite ends of the board-mounting portion.

22. The battery pack of claim 20, wherein the board-mounting portion comprises at least two board-mounting portions, each comprising one of the housing-connecting portions.

23. The battery pack of claim 15, wherein the board-mounting portion of each of the plurality of connector terminals is electrically coupled to a respective one of a plurality of connection terminals of the protection circuit board.

24. The battery pack of claim 13, wherein the connector housing further comprises at least one board-connecting portion having an aperture receiving a connecting member of the connector assembly therethrough, the connecting member being inserted in a through-hole of the protection circuit board for attaching the connector assembly to the protection circuit board.

25. The battery pack of claim 13, wherein each of the plurality of connector terminals comprises a pair of external contacts configured for electrically contacting an external terminal insertable between the pair of external contacts.

26. The battery pack of claim 13, further comprising a holder case mounted on the bare cell between the bare cell and the protection circuit board, the holder case comprising a plurality of fixing protrusions receivable in respective fixing grooves of the protection circuit board for supporting the protection circuit board on the bare cell in at least one direction.

27. The battery pack of claim 13, further comprising a cover frame for protecting the protection circuit board, the cover frame comprising a main cover covering the protection circuit board and having a housing-placing groove receiving the connector housing therein.

28. The battery pack of claim 27, wherein the main cover comprises a first side corresponding to an upper surface of the protection circuit board and second and third sides corresponding to respective sides of the protection circuit board, and wherein the housing-placing groove is on the first side and the second side of the main cover.

29. The battery pack of claim 27, wherein the cover frame further comprises a first auxiliary cover and a second auxiliary cover, the first and second auxiliary covers being integrally formed on respective ends of the main cover.

* * * * *